United States Patent

Pereira

[11] Patent Number: 6,122,640
[45] Date of Patent: Sep. 19, 2000

[54] METHOD AND APPARATUS FOR REORGANIZING AN ACTIVE DBMS TABLE

[75] Inventor: Hilton M. Pereira, Thousand Oaks, Calif.

[73] Assignee: Platinum Technology IP, Inc., Islandia, N.Y.

[21] Appl. No.: 09/159,073

[22] Filed: Sep. 22, 1998

[51] Int. Cl.[7] .................................................. G06F 17/00
[52] U.S. Cl. ........................ 707/103; 707/100; 707/101
[58] Field of Search ............................... 707/8, 100, 101, 707/103, 200, 201, 202

[56] References Cited

U.S. PATENT DOCUMENTS

| | | | |
|---|---|---|---|
| 5,479,654 | 12/1995 | Squibb | 707/201 |
| 5,553,279 | 9/1996 | Goldring | 707/201 |
| 5,721,915 | 2/1998 | Sockut et al. | 707/200 |
| 5,745,753 | 4/1998 | Mosher, Jr. | 707/202 |
| 5,781,903 | 7/1998 | Rusterholz | 707/100 |
| 5,790,848 | 8/1998 | Wlaschin | 707/201 |
| 5,881,379 | 3/1999 | Beier et al. | 707/101 |
| 5,887,274 | 3/1999 | Barry et al. | 707/202 |
| 5,890,154 | 3/1999 | Hsiao et al. | 707/8 |
| 5,963,961 | 10/1999 | Cannon et al. | 707/202 |
| 5,983,239 | 11/1999 | Cannon | 707/200 |
| 5,991,772 | 11/1999 | Doherty et al. | 707/202 |

OTHER PUBLICATIONS

Oracle 7tm Server, *SQL Language Reference Manual*, Part No. 778–70–1292, Dec. 1992, pp. 4–89 thru 4–96.
Oracle 7tm Server, *Concepts Manual*, Part No. 6693–70–1292, Dec. 1991, pp. 51–1 thru 15–14, 21–31 thru 21–32.

*Primary Examiner*—Wayne Amsbury
*Assistant Examiner*—Thuy Pardo
*Attorney, Agent, or Firm*—Fliesler Dubb Meyer & Lovejoy LLP

[57] ABSTRACT

Reorganization of database tables is performed while the tables being reorganized are available for normal OLTP activity. A trigger is setup to record OLTP activity on a source table to be reorganized. The source table is momentarily locked to establish an SCN checkpoint and determine the location of data blocks allocated for the source table. A copy of the table is created (new table) and blocks untouched/modified since the timestamp are unloaded from the source table and inserted into the new table. Transactions occurring since the timestamp are performed on the new table until no more transactions since the timestamp remain in the trigger record. The new table is switched with the source table (renamed as the source table), and the original source table is dropped.

29 Claims, 14 Drawing Sheets

METHOD AND APPARATUS FOR REORGANIZING AN ACTIVE DBMS TABLE

BACKGROUND OF THE INVENTION

1. Field of the Invention

This invention relates to the reorganization of a database management system (DBMS) table. The invention is more particularly related to the reorganization of DBMS tables while the DBMS tables remain available to users of the DBMS. The invention is still further related to a reorganization process that unloads DBMS tables directly from DBMS data files while bypassing an SQL interface provided for data retrieval by the DBMS.

2. Discussion of the Background

Modern database management systems are increasingly called upon to maintain larger stores of data. In addition to the increased size of databases, the structure within modern databases is increasingly complex.

Typically, a database maintains data in the form of tables, each table maintaining one or more rows of related data. As an example, a basic database table may maintain plural rows having, for example, name, social security number, address and telephone number of individuals belonging to an organization.

The database would be increased in size as the organization adds new members, and would increase in both size and complexity as additional information about members is included. For example, a larger and more complex database could maintain, in addition to the above information, a map, perhaps in graphical format, showing the club members' residence. The database could again be increased in size and complexity by including a work address and an additional graphical map showing the location of the work place.

The database table may again be increased in complexity by maintaining pointers to other tables or rows of the database. For example, a pointer to a set of coworkers maintained in another table, pointers to nearby organization members, or a pointer(s) to any number of items to where additional member data may be maintained.

Conventional Database Management Systems (DBMS) provide space for building database tables by allocating blocks. Once a table is defined, the DBMS will allocate blocks necessary for storing rows of the related data. For example, if a table is to be built to contain 100,000 rows, and the rows of the table were defined such that 100 rows could fit per block, the DBMS would allocate 1,000 blocks to build the table.

Generally, DBMS systems allocate blocks in sets of contiguous blocks. A contiguous set of allocated blocks is commonly referred to as an extent. As a general rule, extents vary in size. Using the above example, the DBMS may utilize a single extent of 1,000 blocks, 2 extents of 500 blocks, or any other combination of extent sizes to allocate the required 1,000 blocks to build the table. Once the required blocks are allocated, the data is then stored in rows in the table utilizing the blocks allocated.

Over the course of time, additional data may be added to the table and the DBMS will allocate additional blocks as required. For example, if a user adds 250 rows to the table, using the above parameters, an additional 3 blocks would need to be allocated.

Also over the course of time, information in the database may be deleted. In this case, deletion of rows occurs through the use of SQL to delete rows from the table. For example, a user may delete fifty rows from block 1, 40 rows from block 20, and 30 rows from block 60. When this occurs, it causes there to be more blocks in the table than required to maintain the data present in the table.

In addition, data within the database will be updated. For example, using the above-described database tables, a organization member who has not yet entered the workforce would have a row in the table allocated that maintained his/her name, address, social security and telephone number. Upon entering the workforce, the row would be updated to include the work address and related information. However, if a substantial amount of information is added as a result of the update, the original row may not have enough blocks of data allocated to maintain the updated information.

Row migration occurs when a row gets updated and the original row does not have enough space to hold all of the updated information. When this occurs, the row is moved to a location with more space, and a pointer is placed in the block where the original row resided, the pointer being set to point to the location of the moved (migrated) row. A large amount of row migration is caused if there are substantial updates to a table and an inadequate amount of space was allocated for the original rows.

More often than not, there is insufficient space within a block to hold an updated row. In this case, the row is migrated to an entirely different block than where the original row resided, and the pointer is placed in the original row position points to the updated row in the different block.

Anytime a row is migrated it causes what is known as fragmentation. Fragmentation causes greatly increased retrieval time of database information because in addition to reading a block, a pointer must be read and interpreted. When a row is migrated to another block, at least two blocks (the block containing the pointer, and the block containing the migrated/fragmented row) must be read to retrieve row specific information. Other structural changes within the database tables also cause fragmentation and related efficiency problems (row chaining, for example).

From time to time, the Database Administrator (DBA) will perform an analysis on the DBMS tables that provides information regarding the condition of the tables. For example, the database administrator may look at information regarding the number of deleted rows to ascertain efficiency information with respect to how many blocks are holding deleted rows. As another example, the Database Administrator may look to see how many rows of a table have been migrated or fragmented by other processes.

If a lot of fragmentation has occurred, it indicates that block size and row space could be more efficiently allocated and that table data is not being retrieved efficiently. When this occurs, the database administrator will likely decide to rebuild the tables.

In another example, when creating a table, the DBA makes a decision regarding the structure of a database table by setting a percentage of blocks free (PCTFREE) or percentage of blocks used (PCTUSED). As the DBMS fills up each block with row or table information, it will keep a percentage of a block free at least equal to the percentage PCTFREE.

The DBA sets the PCTFREE variable depending on how the database table is to be used. For example, if a table is to have frequent updates, additional PCTFREE would be established so that enough space is available to allow any necessary row migration to occur within the same block. As discussed above, row migration within the same block does not cause a table to become fragmented. Migrated, but non-fragmented rows are retrieved with a single block read rather than the cumbersome process of reading a block, interpreting a pointer, and reading a second block (or more) as occurs when migrated rows are fragmented. Therefore, appropriate PCTFREE settings allow DBMS performance to be maintained although the database tables may be modified.

PCTUSED is another parameter that allows the DBA to control the structure of a DBMS table. The DBMS prevents additional rows to be placed in a block unless the percentage of that block has fallen below PCTUSED. PCTUSED is different from PCTFREE in the sense that although a block may be used if there is an update, it will not be used to insert a new row unless the percentage used in the block is below PCTUSED.

A DBMS table involved in heavy OLTP activity (inserts, updates and deletes) over time could experience row migration, fragmentation, row chaining, etc. Furthermore, various database tables may not necessarily have appropriate settings (PCTFREE, PCTUSED) when first built, or the needs of the database table may have changed, resulting in additional migration, deletion or fragmentation of tables. This in turn results in degradation of performance of data retrieval and space usage.

The DBA will perform an analysis to determine whether the tables are storing data efficiently. As a result, one or more of the DBMS tables may be determined to being inefficient in storing and retrieving data. Reorganization (rebuilding) of the table is a solution to this problem. In order to achieve maximum performance the table needs to be rebuilt (i.e., the data unloaded into secondary space and a fresh instance of the table rebuilt). This process gets rid of many of the unwanted effects mentioned above because the fragmented rows are unloaded and stored without fragmentation in the rebuilt table.

Currently, products that reorganize DBMS tables claim being online to the extent where DBA's attempting such a process in their environments don't have to shut down the database and the database is online. However, the tables or list of tables being reorganized are actually off limits to users since the reorganization process locks the table or tables in question. In shops that require access 7 days a week, 24 hours a day, this could potentially create unacceptable downtimes. The time involved to reorganize large objects under a lock makes the process not viable and hence DBA's are unable to apply a reorganization process.

SUMMARY OF THE INVENTION

The present inventor has realized the need for an online reorganization of database tables where the database tables remain available for all intended purposes throughout the reorganization process.

Accordingly, it is an object of the present invention to provide for reorganization of database tables while maintaining full availability of the tables and table rows during the reorganization process.

It is another object of this invention to provide a method to increase the speed at which an online reorganization of database tables is performed.

These and other objects are accomplished by a method for reorganizing a database source table including the steps of establishing an SCN checkpoint on the source table, creating a reorganized copy of the source table in a state just prior to the SCN checkpoint, applying transactions occurring after the checkpoint to the reorganized table, and switching the source table with the reorganized table. The method further includes the steps of creating a trigger on the source table for logging entries of transactions on the source table in a transaction table, obtaining a lock on the source table to prevent transactions from occurring to the source table, deleting entries logged by the trigger prior to obtaining the lock on the source table, and unlocking the source table.

The steps of creating a trigger and obtaining a lock are performed prior to the step of establishing a checkpoint. After switching the source table with the reorganized table, the original source table may be dropped making space available for new or other tables.

The present invention provides a method and apparatus where a DBMS table can be reorganized while maintaining full availability of the table rows during the reorganization process. The reorganization process has two main components: (1) a trigger on a source table to record transactions into a transaction log table; and (2) the ability to unload rows directly from DBMS datafiles bypassing the SQL interface.

The reorganization process is carried out in two phases. The first is the bulk unload and load phase in which rows of data will be unloaded from Oracle blocks. The blocks in question have to be untouched up to a certain point in time. The point in time to be established is the time a trigger is created on the source table, (i.e., all transactions and block modifications that occur after the trigger is established will be recorded in the transaction log).

The second phase in the reorganization process is the processing of the transaction log table and bringing the new table in sync with the source. Once the new and source tables are synchronized, the reorganization process applies a switch over process that includes dropping the source table and renaming the new table to the original name of the source table.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

The conceptual theory for an online reorganization of a database table provides for reorganization of the table while it remains unlocked and available to users of the table.

Reorganization is defined as the process of eliminating row chaining, migration and general data fragmentation that is a consequence of OLTP activity (inserts, updates and deletes) on a table. Generally, reorganization is performed by physically rebuilding the table.

The present invention makes the following assumptions:

a) The reorganization process has DBA privileges;

b) The reorganization process has a free tablespace (blocks) available that is large enough to hold the source table plus the anticipated growth of the table during the reorganization;

c) The source table being reorganized will not incur Data Definition Language (DDL) modifications during the reorganization process;

d) The source table will be available for normal OLTP activity; and e) The reorganization process may contend for a table lock from time to time, just like a normal application might need to do so in an OLTP environment.

At this point, it is important to note that the present invention is described in general terms and using specific examples consistent with the structure of Oracle database systems. However, other database systems using entirely different structures are also within the scope of the present invention.

For example, in order to reorganize a database table, the structure of the database table must be known. A key element in the structure of an Oracle table is the Oracle Row Address, also known as the "rowid."

The rowid consists of a file number, block number and slot number. This uniquely defines and can be used to locate an Oracle row. A file contains Blocks and Blocks contain slots which point to an Oracle row in the block. However, database structures based on pages or other organizational techniques also apply. In this case, specific row information is obtained by identifying the relevant pages and row identifiers consistent with the other database structure.

As another example, a DBMS generally provides the ability to record or log changes that occur in the database (OLTP activity). In the Oracle DBMS, every transaction or change in the state of the database is recorded against a System Change Number (SCN). The Oracle DBMS guarantees the uniqueness and always increasing property of the SCN. Therefore, the SCN will be utilized when identifying a change in the database, and another similar property will be utilized when applying the present invention to another DBMS.

Figure 1A:
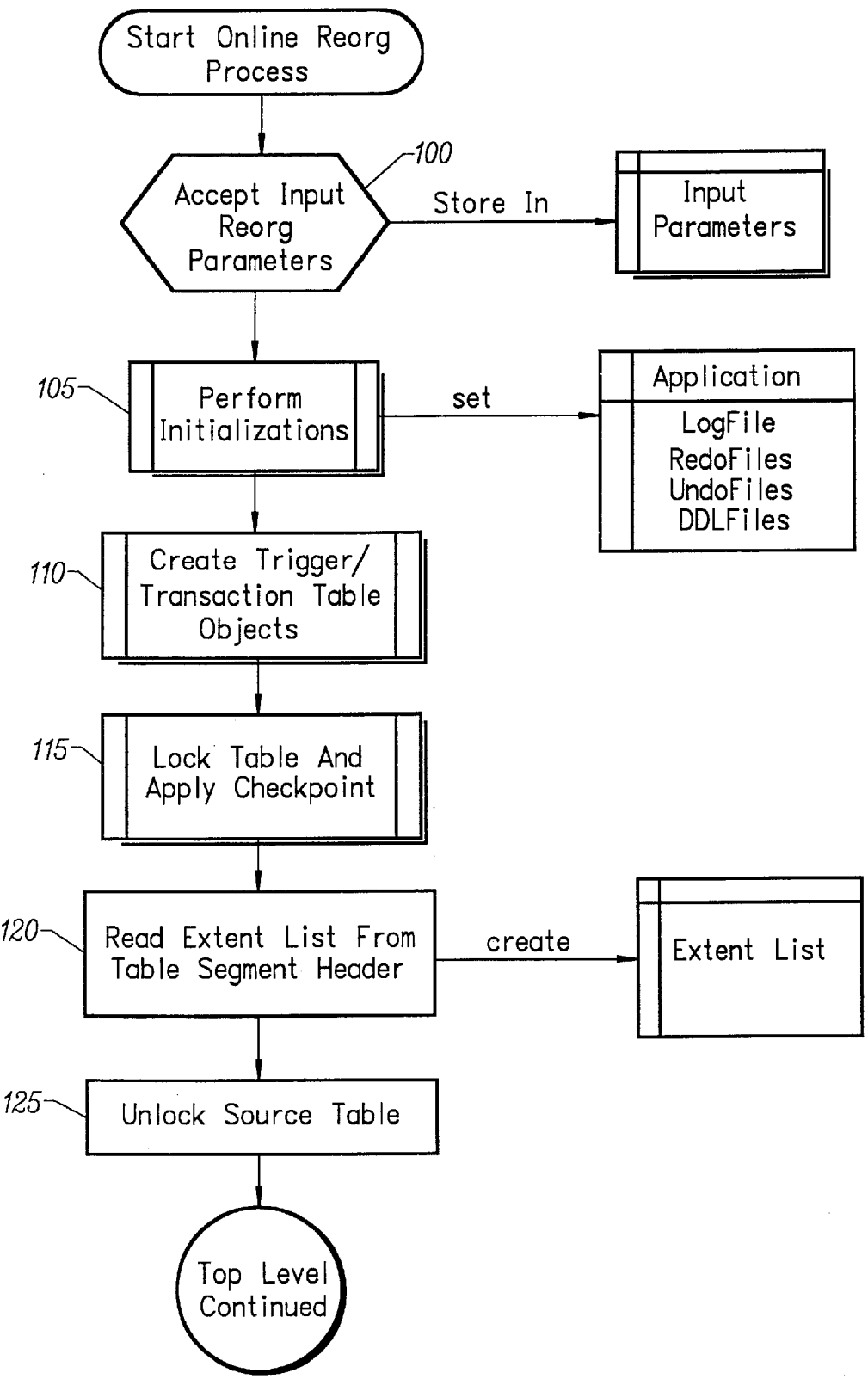
FIG. 1(a) is a flow chart illustrating the high level processes of an online reorganization according to the present invention.

Referring now to the drawings, wherein like reference numerals designate identical or corresponding parts throughout the several views, and more particularly to FIG. 1A thereof, there is a flowchart illustrating high level processes of the online reorganization process according to the present invention. The reorganization is started at step 100, where the reorganization process accepts reorganization input parameters. The reorganization input parameters include items such as the name of the table to be reorganized and other parameters providing specific information on how the reorganized table should be put together. Table 1 provides a listing of input parameters utilized by the present invention. Other parameters may also be input, for example, including, but not limited to, PCTFREE and PCTUSED.

TABLE 1

Description of User definable Reorg Parameters. The input is made available to the reorg process.

| | |
|---|---|
| Login | User's login Name |
| Password | User's Password |
| Sid | Oracle Sid |
| Home | Oracle Home |
| doFailurePrediction | do failure prediction flag |
| FirstLock.Wait | Initial Lock Wait in seconds |
| FirstLoc.Retry | Initial Lock No of Retries |
| Table.Name | Table Name |
| Table.Owner | Table Owner |
| Table.ChangeDDL | New Table modifications to apply |
| WorkSpace | Tablespace name for temporary storage |
| ExportDirectory | File System Directory names(s) to use for file storage |
| Tablespaces | New table storage informations |
| TransactionLock.Wait | Lock parameters while applying Transactions |
| TransactionLock.Retry | |
| WindowTimeOut | Time allowed to keep the table locked |
| Switch | Switch Strategy information |
| Threshold.Tries | No times to try switching to new table |
| Threshold.Exceed | Indicator of action if Threshold.Tries is exceeded. |

Figure 2:
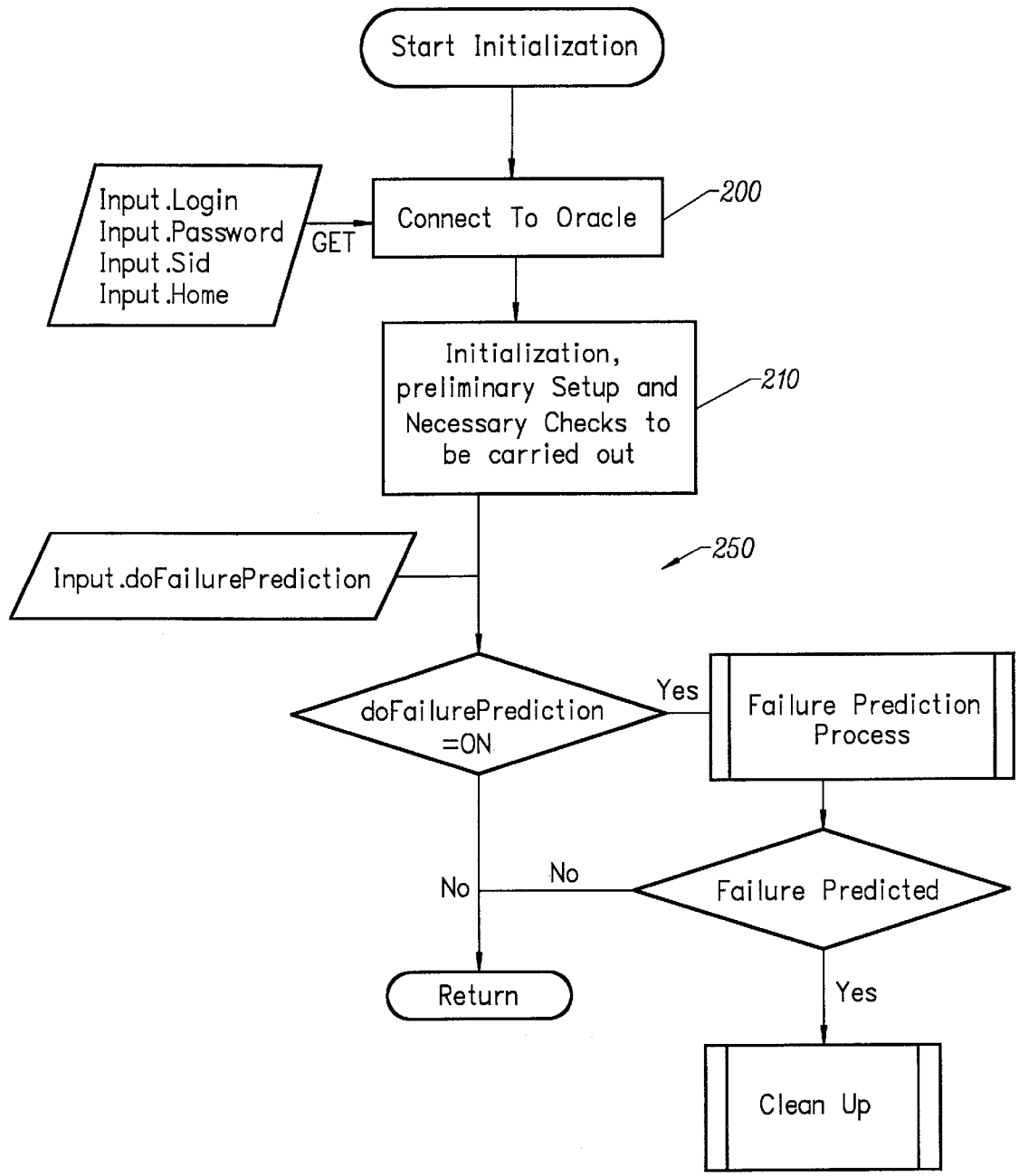
FIG. 2 is a flowchart illustrating the initializations performed prior to reorganization of the database tables.

Included in step 100 is an initialization process (See FIG. 2) that connects to a database (Oracle, in this example, at step 200), performs preliminary set up (step 210), and invokes a failure prediction process 250 that performs pre-organization checks that assure the database is in condition to be reorganized.

At Step 105, the various initializations as required are performed. For example, a log file for storing transactions, hereinafter referred to as a transaction table, is created. Table 2 provides an example definition of a translation table which will be described in greater detail below.

TABLE 2

```
CREATE .TABLE <c.owner>.TSREORG$LOG (\
    ROW$$ rowid\
    dmltype char(1) . \
    updtime date) <storage parameters>
```

At Step 110, a trigger is created on the source table that logs any activity (including OLTP information) performed on the source table. The trigger enters log information, such as, for example, rowid, type of transaction, and current time stamp. The transaction table will include an identifier for the type of transaction, including references such as "I" or insert, "U" for update, and "D" for delete. Other methods for identifying the transactions occuring to the source table may also be utilized (for example, number codes identifying the transaction). Table 3 illustrates an example programming structure for implementing a trigger designed to operate in conjunction with the transaction table.

TABLE 3

CREATE OR REPLACE TRIGGER <c.owner>.TSREORG$TRIG
   after insert or update or
   delete on <c.owner.c.table>\
   referencing old as old\
   for each row    declare dmltype char; \
        begin    if inserting then
            dmltype: ='I';\
          elsif updating then dmltype:='U';\
          elsif deleting then dmltype:='D';\
          end if; \
          insert into <c.owner>.TSREORG$LOG
            (row$$, dmltype)

Figure 3:
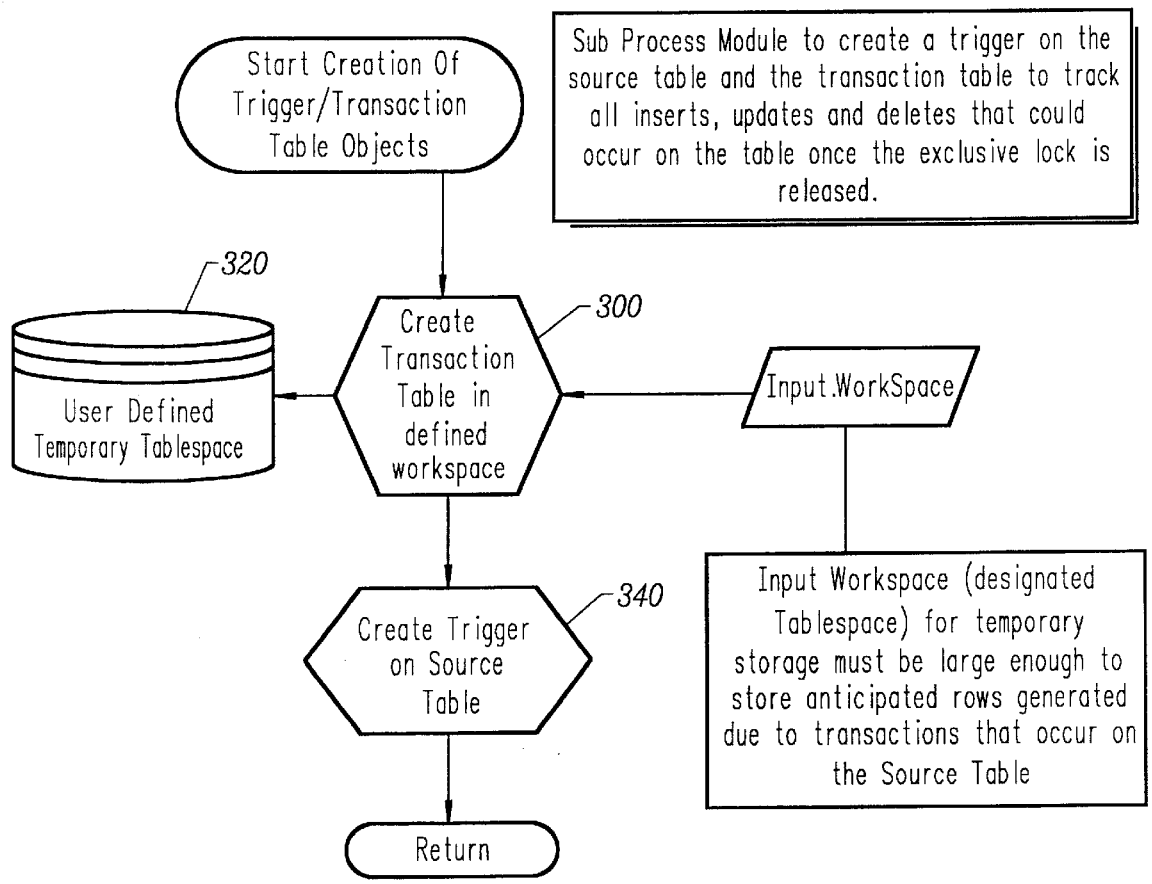
FIG. 3 is a flowchart illustrating the creation of process objects.

FIG. 3 illustrates one embodiment of the present invention, where creating a transaction table and a trigger are combined as shown in step 110. In FIG. 3, the transaction table is created (step 300) and stored in a User Defined Temporary Tablespace 320. The User Defined Temporary Tablespace 320 provides enough storage space to hold any anticipated additions and updates to the source table.

Once the trigger and transaction table have been set up, the source table is locked and a checkpoint is created (Step 115). The lock on the source table may be acquired via any process that prevents updates from being performed on the table. Generally speaking, an amount of wait time and a number of tries to acquire the exclusive lock will be applied if a first attempt at acquiring the lock is not successful.

Figure 4:
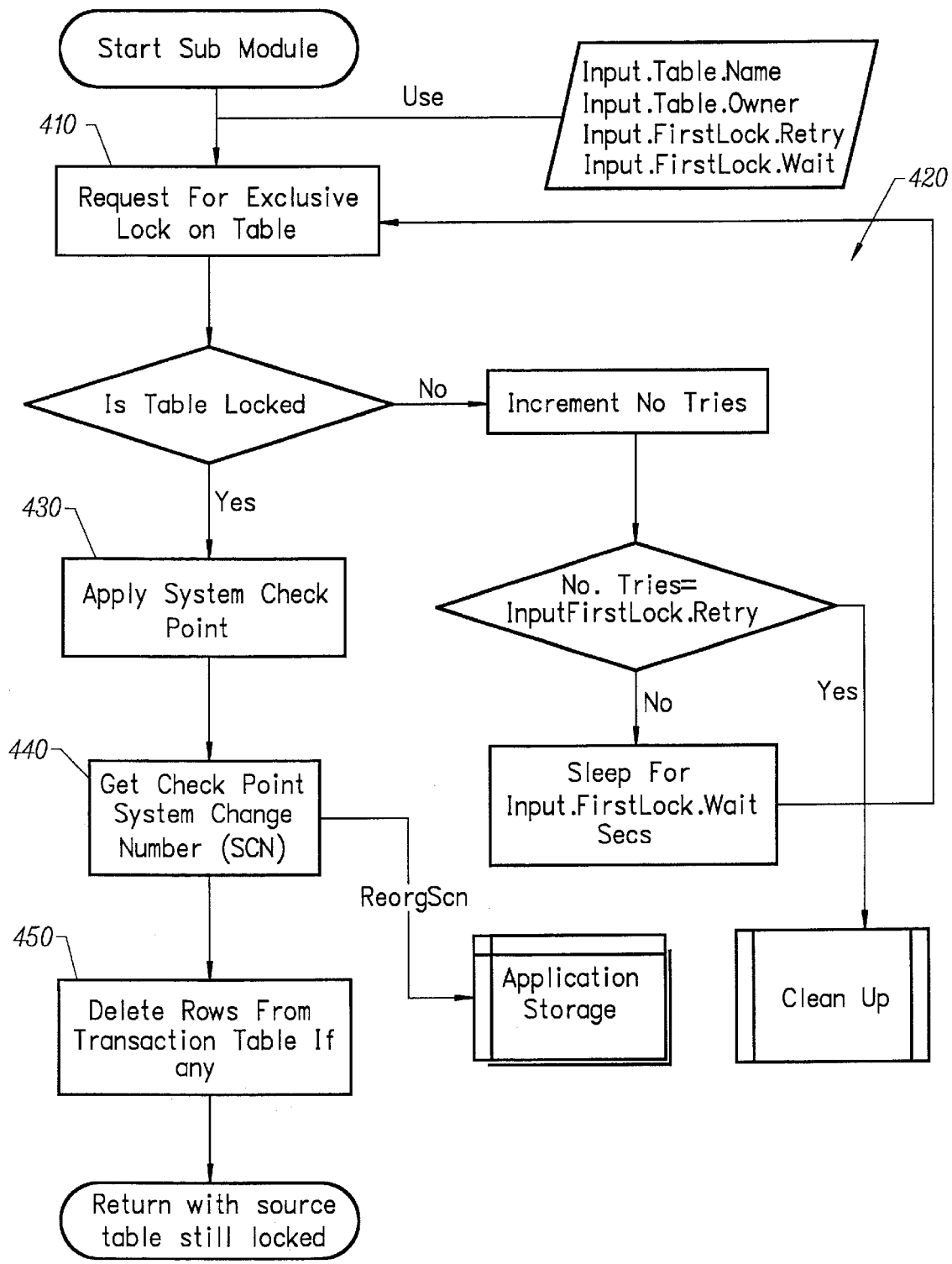
FIG. 4 is a flowchart illustrating the locking of a table and the application of a checkpoint.

FIG. 4 illustrates a detailed process for acquiring the exclusive lock and acquiring the checkpoint. At step 410, an exclusive lock is requested. If the lock is not obtained, a retry process 420 is invoked. Once the source table is locked, the SCN number for a checkpoint is obtained (steps 430 and 440).

The checkpoint is any identifier or other method (such as a timestamp, a combination of a checkpoint and another reference, or an external reference, for example) that uniquely identifies a point in time or a state of the database. For example, in an Oracle database system, an SCN is applied to each transaction that occurs within the database. Since the Oracle system guarantees the uniqueness and ever-increasing quality of the SCN, it is well suited for use as a checkpoint. Thus, at Step 115, the source table is locked and an SCN or other similar identifier is obtained as a checkpoint (also referred to as CHECKPOINT_SCN, or ReorgScn). Table 4 provides a listing and description of variables utilized in programming the reorganization process, including ReorgScn.

TABLE 4

Description of Application Variables used during the reorg process

| | |
|---|---|
| ReorgScn | Reorg's defined System Change Number |
| redoFiles | Application defined redo information files |
| undoFiles | Application defined undo information files |
| ddlFiles | Application defined DDL information files |
| insertStmt | Insert Statement DDL for Table Load |

At Step 120, while the source table is locked, a segment header of the source table is read and a list of blocks (also referred to as an extent list) is created. The segment header of the source table is a file that stores identifiers that identify data blocks allocated for use by the source table. The extent list identifies the blocks from which source table data will be unloaded from.

In Oracle database management systems, the segment header identifies extents (contiguous blocks of data) allocated either when the table was created or during updates of the table that required additional space over and above that which was already allocated for the table. Therefore, in an Oracle system, the extent list created in Step 120 is basically a list that includes each extent allocated for the source table, each of those extents identifying a contiguous set of data blocks storing table data.

In the context of the present invention, the segment header of the source table is broadly defined as any file or storage device that maintains a list of where the data stored in the source table is located. For example, a database management system may allocate dataspace based on pages. In this case, the extent list created at Step 120 would include page information and other data required to identify where data of the source table is stored. Therefore, any number of database management systems and their individual structures may be accommodated using the teachings of the present invention.

At Step 125, the source table is unlocked. Before unlocking the source table, the rows that have been generated in the transaction table prior to the checkpoint established in Step 115, are deleted (step 450, FIG. 4, for example). The process of creating the trigger, locking the table, establishing a checkpoint, and then deleting transactions logged in the transaction table prior to establishment of the checkpoint (since the table is locked prior to establishing the checkpoint, this process may be performed by deleting all entries in the transaction table while the source table is locked), assures that the transaction table only maintains entries that have occurred since the table was locked and checkpoint established.

Figure 1B:
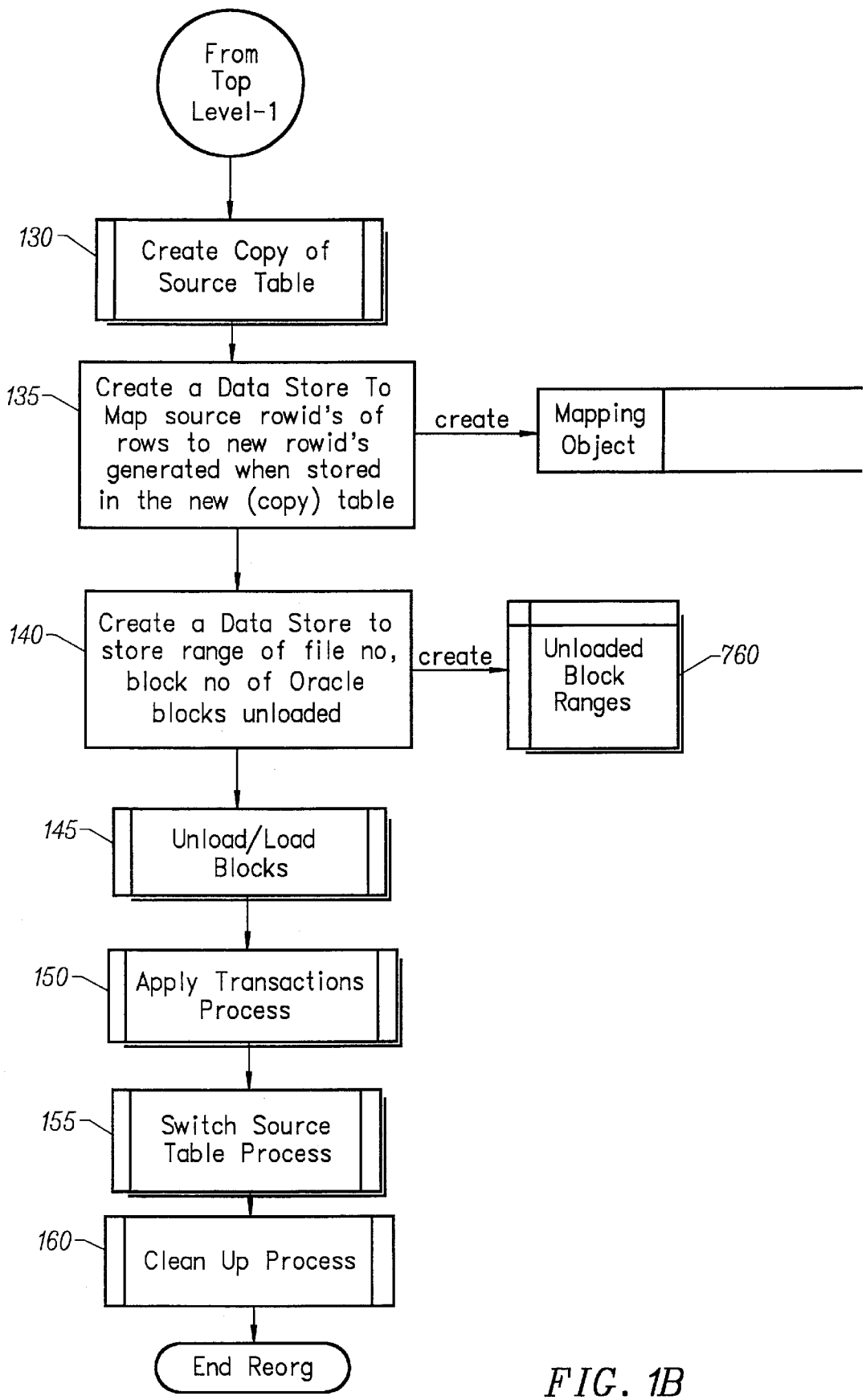
FIG. 1(b) is a continuation of the flowchart of FIG. 1(a) illustrating the high level processes of the online reorganization.

Continuing with reference to FIG. 1B, at step 130, a copy of the source table is created (hereinafter referred to as the new table). The new table is based on the source table as originally created and includes all applicable user requested DDL modifications to the table.

Figure 5:
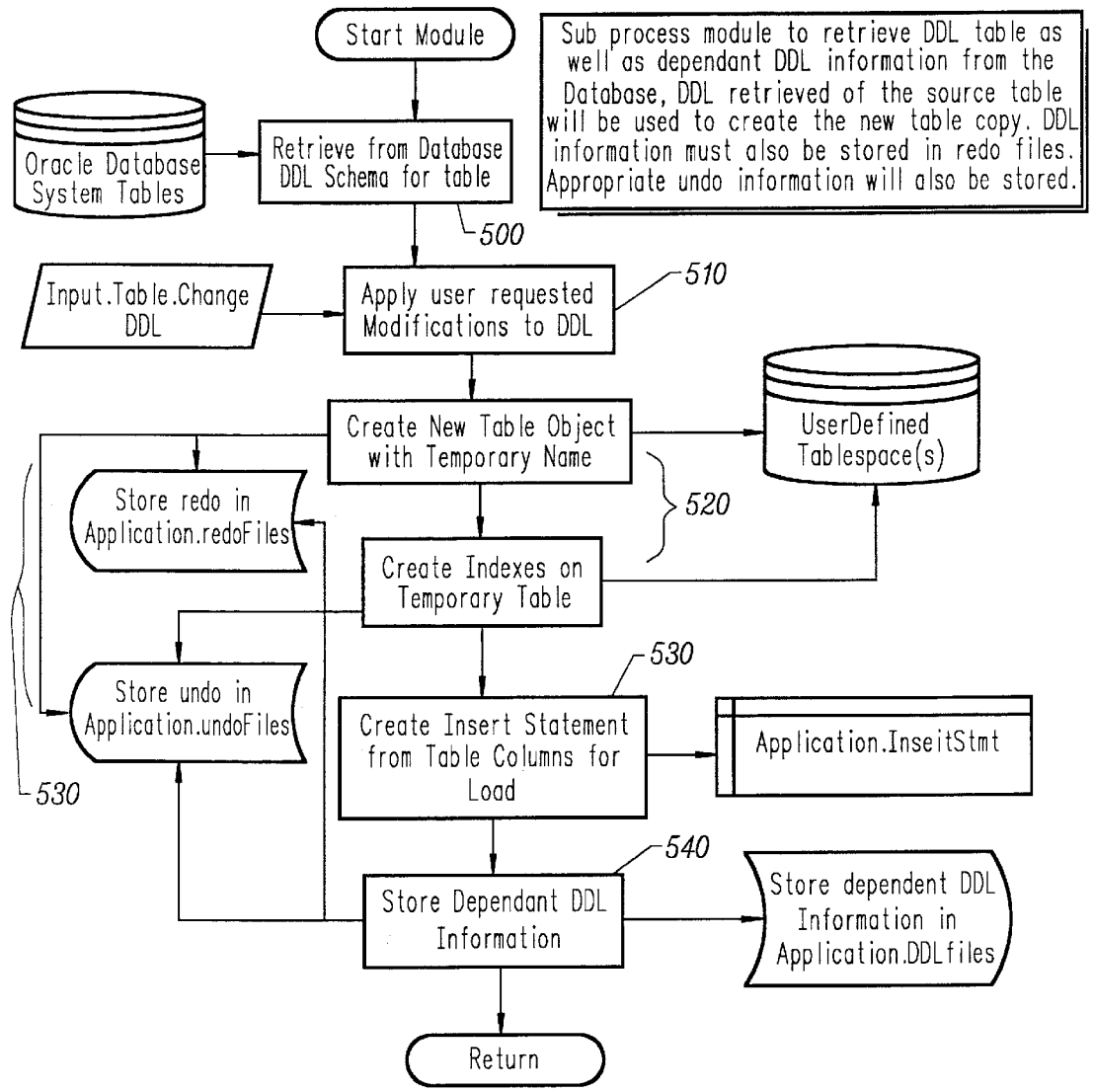
FIG. 5 is a flowchart illustrating the creation of a copy of a source table.

FIG. 5 is a flow chart illustrating the creation of a copy of the source table. At step 500, the Data Definition Language (DDL) scheme defining the source table is retrieved. User requested DDL modifications are applied to the DDL (510), and a new table object including indexes is created (520). These processes are logged in redo and undo files created at initialization (See step 105, FIG. 1A). An insert statement for loading the new table is created based on the DDL of the new table (530) which is stored for later reference (540).

Eventually, row data will be unloaded from the source table and loaded into the new table. At step 135, a mapping table is created to map rowids of the source table to rowids of the rows inserted into the new table. Regardless of whether the DBMS makes rowids available, the mapping table is setup to contain complete information regarding where rows are unloaded from the source table and where they are stored in the new table.

At Step 140, a data store (unloaded block ranges) is created to store a range of file numbers and block numbers of blocks unloaded from the source table. The present invention creates a record of the file/block numbers unloaded in the data store. Because Oracle allocates blocks in contiguous ranges, it is likely that the unload process will be unloading blocks in contiguous ranges, hence in an Oracle system, it will be sufficient to store ranges of file/block numbers combinations. This has an advantage of minimizing storage requirements as opposed to storing every file/block number unloaded. However, in another DBMS, storage of each individual file/block number combinations or other methods of tracking unloaded blocks may be more efficient.

At Step 145, data blocks are unloaded from the source table and the data contained therein is loaded into blocks of the new table. The unload process comprises reading data blocks from the extent list created at step 120. Rows are then extracted from the unloaded blocks and loaded into the new table.

To improve speed, the reorganization process bypasses the DBMS SQL interface and reads data blocks and extracts row data directly from the DBMS data files. Bypassing the SQL interface of a DBMS requires knowledge regarding the structure of the DBMS files. Retrieving rows of data from data blocks stored in the DBMS files requires knowledge of the structure of the block. DBMS block and file structure may be obtained either from a specification describing the structure or by investigation of a block already created.

Figure 6:
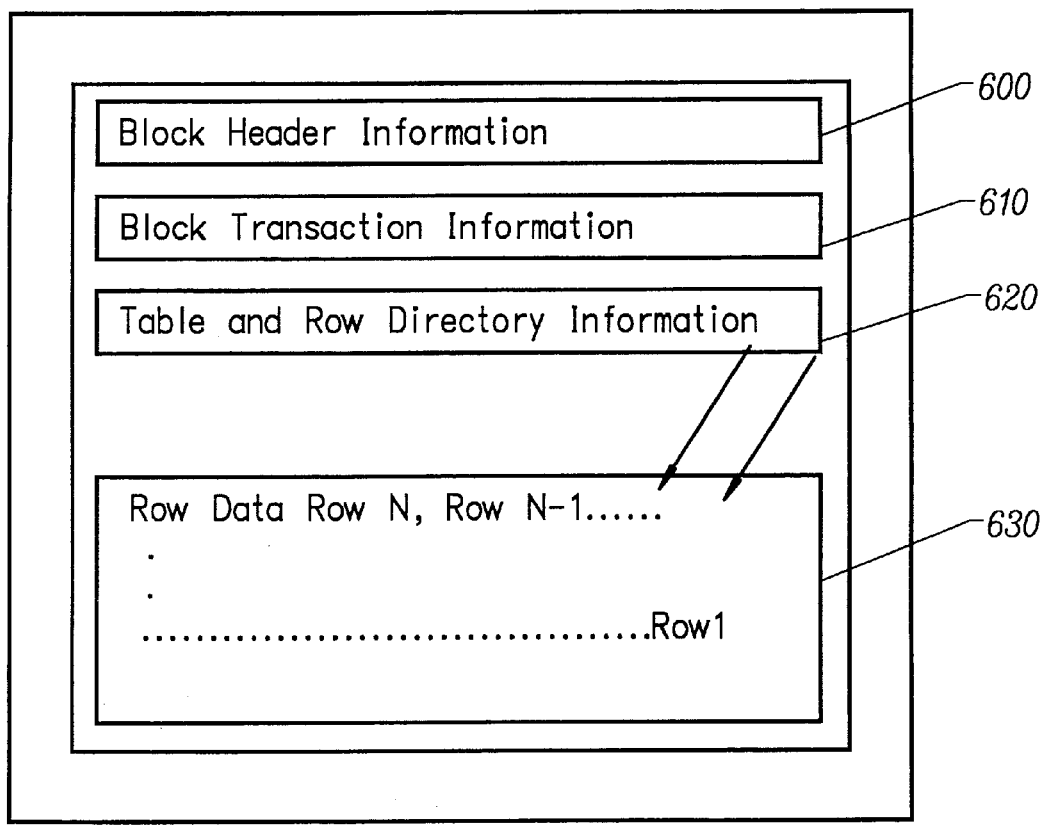
FIG. 6 is an illustration of a data block structure.

For example, FIG. 6 illustrates the structure of an Oracle data block. Each data block of an Oracle table is made up of a block header 600, block transaction information area 610, and a table and row directory 620 containing pointers to row data 630. In Oracle, the row data itself is filled bottom up.

Utilizing the above-described structural information, an Oracle DBMS file may be opened, data blocks read, and row information extracted therefrom. The extracted row information is loaded into the new table. As discussed above, similar operations may be performed on DBMS systems other than Oracle, which is presented herein as an example.

The unload process will utilize the SCN number (CHECKPOINT_SCN) established at Step 115, to determine whether a block is unloaded. Only blocks having an SCN less than CHECKPOINT_SCN will be unloaded. Blocks having an SCN greater than CHECKPOINT_SCN will be skipped. A skipped block list is also maintained to identify blocks that have been skipped in the unload/load process.

Figure 7:
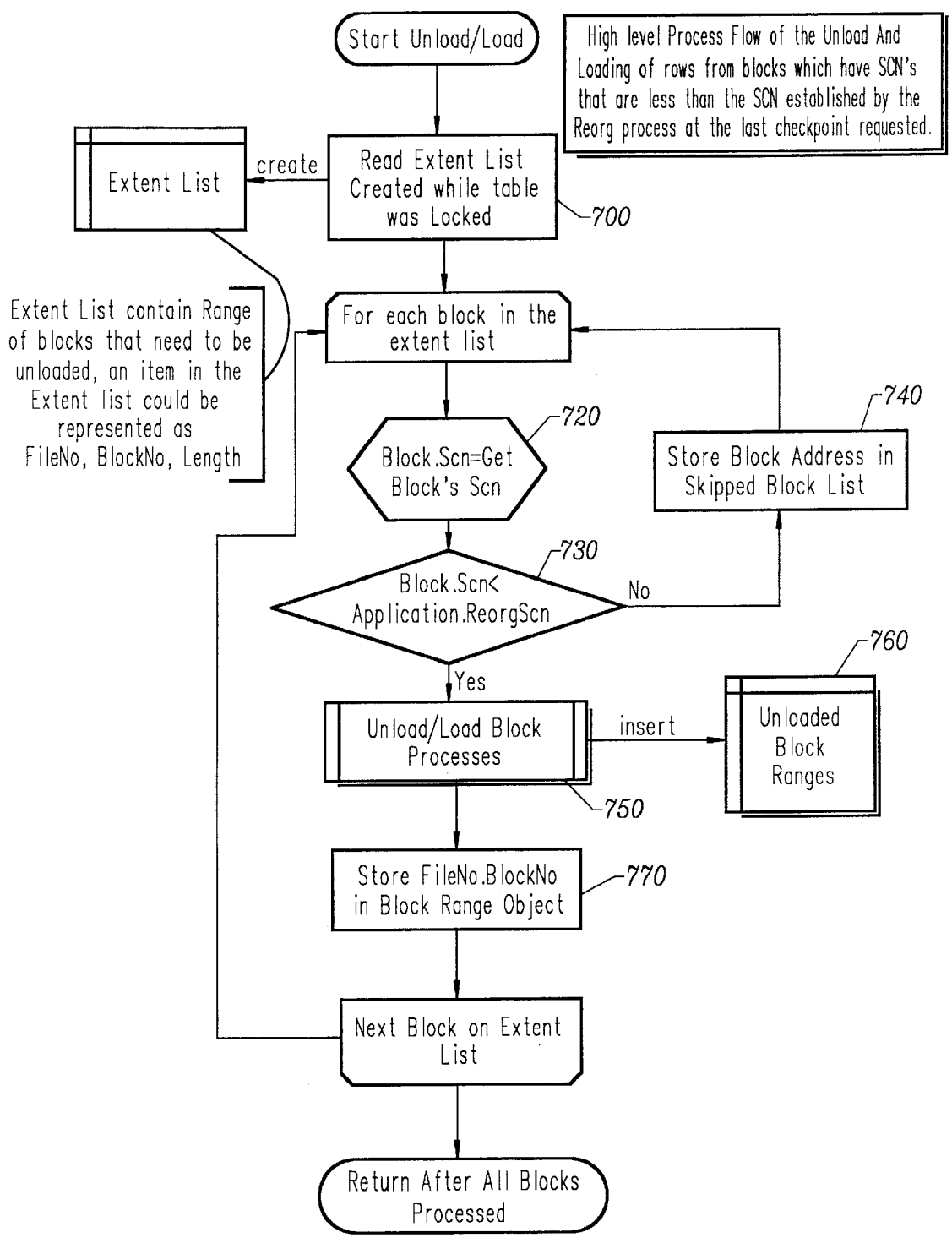
FIG. 7 is a flowchart illustrating the unload/load of datablocks from a source table to the copy of the source table.

The unload/load blocks of step 145 is shown in more detail in FIG. 7. At step 700, the extent list is read, and the SCN of each block on the list is determined (720).

If a block SCN is less than CHECKPOINT_SCN (ReorgScn), it indicates that the block has not been modified since the checkpoint was established. In this case, the block is directed to be unloaded from the source table and loaded into the new table (step 750), and the block is added to the unloaded block ranges 760. If the SCN of the block is greater than CHECKPOINT_SCN, the block is added to the skipped block list (step 740). Each block in the extent list is applied to the same process.

As each row is unloaded and inserted into the new table, the rowid of the source table is mapped to its new rowid in the new table and stored in the mapping table. The mapping table is utilized to process deletions of specific rows, if needed, in the latter half of the reorganization process. The mapping can be stored in the form of a table in the DBMS, in memory, on a file system, or any other method in which the mapping table may be maintained and later used by the reorganization process. Table 5 provides a description of lists utilized in one embodiment of the present invention.

TABLE 5

Description Lists used during the reorg process

| | Extent List Node in the List contains |
|---|---|
| FileNo | Oracle Data File Number |
| BlockNo | Starting Oracle Data Block |
| Length | No. of Blocks in this Extent |
| | Transaction Block List Node in the List contains |
| FileNo | Oracle Data File Number |
| BlockNo | Oracle Block Number |
| Count | No. of transactions for this block |
| | Transaction List Node in the List contains |
| rowid | Oracle Row Address |
| type | Transaction Type either I = insert U = update D=Delete |
| | Delete And Insert List Node in the List contains |
| SlotNo | Slot where row is stored in an Oracle block |

As shown in Table 5, the Extent List is utilized for identifying block information during the process of unloading the source table. The Transaction Block List identifies blocks where and what type of transactions that have taken place. The Transaction List provides a rowid and transaction type for each transaction identified in the Transaction Block List. And finally, the Delete and Insert List identifies slot numbers for each rowid identified in the Transaction List. The above lists are compiled by retrieving information from the transaction table and are utilized in the apply transactions process (See FIG. 9, blocks 910, and 920, for example).

Figure 8:
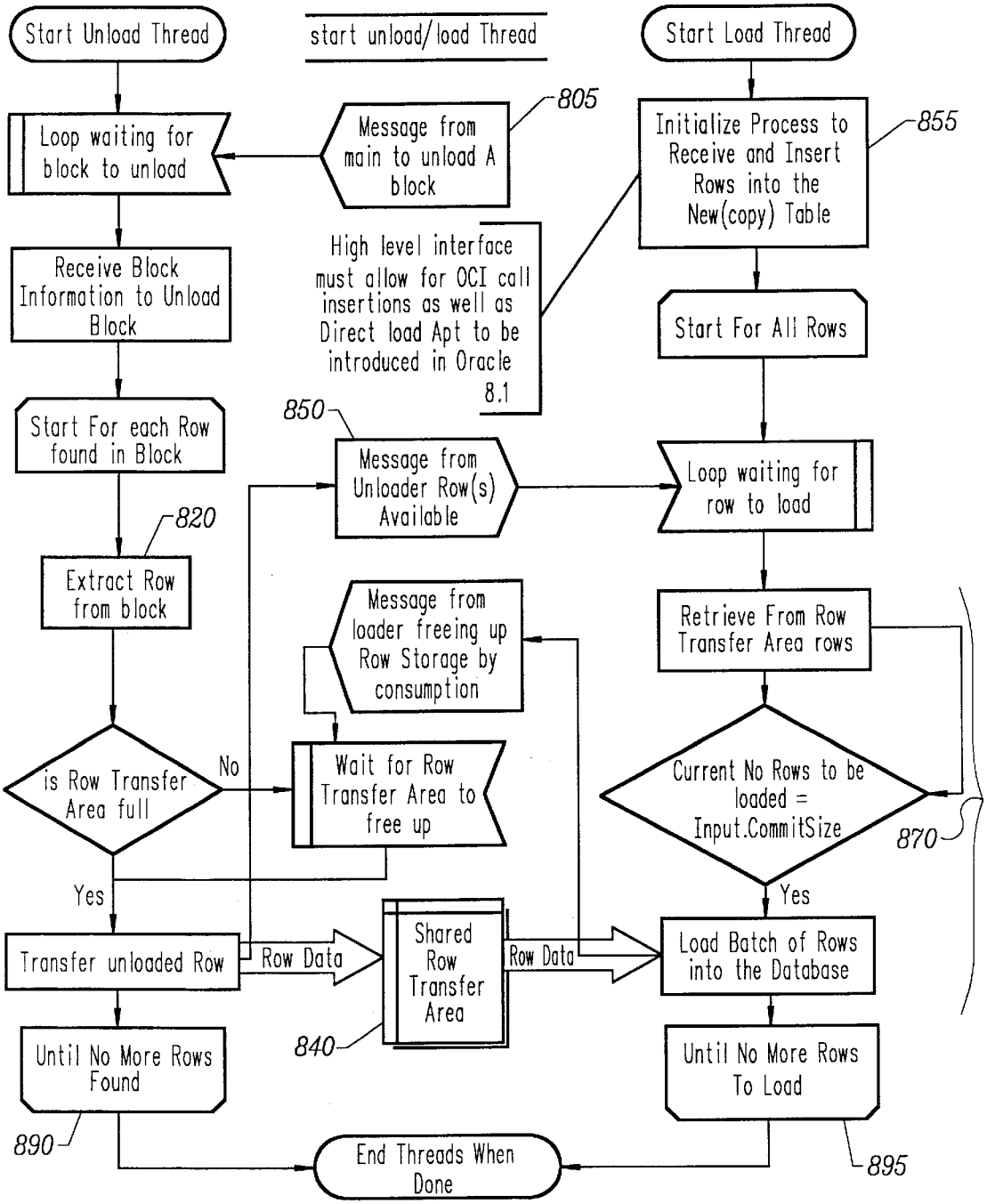
FIG. 8 is a flowchart illustrating functions and interactions of separate unload and load block processes.

FIG. 8 illustrates separate unload and load processes (threads) utilized by the present invention. The load thread is started by a message 805 indicating a specific block to unload (see FIG. 7, step 750, for example).

As each row is extracted (step 820), it is transferred into a shared row transfer area 840 and a message is sent to the load thread indicating that an unloaded row is ready for transfer (step 850).

The load thread, having been previously initialized (step 855), receives the message indicating a row ready for transfer. The row in the transfer area is retrieved and the data from the row is loaded into the new table (870). The unloading of rows, transfer, and loading data into the new table is repeated by the unload and load threads for each row in the block (steps 890 and 895).

For the duration of the unload and load processes, the source table is available to users for normal OLTP activity. Transactions generated on rows are recorded via a trigger into the transaction table. The second phase of the reorganization process is to process the recorded transactions (Apply Transactions Process, step 150).

Figure 9A:
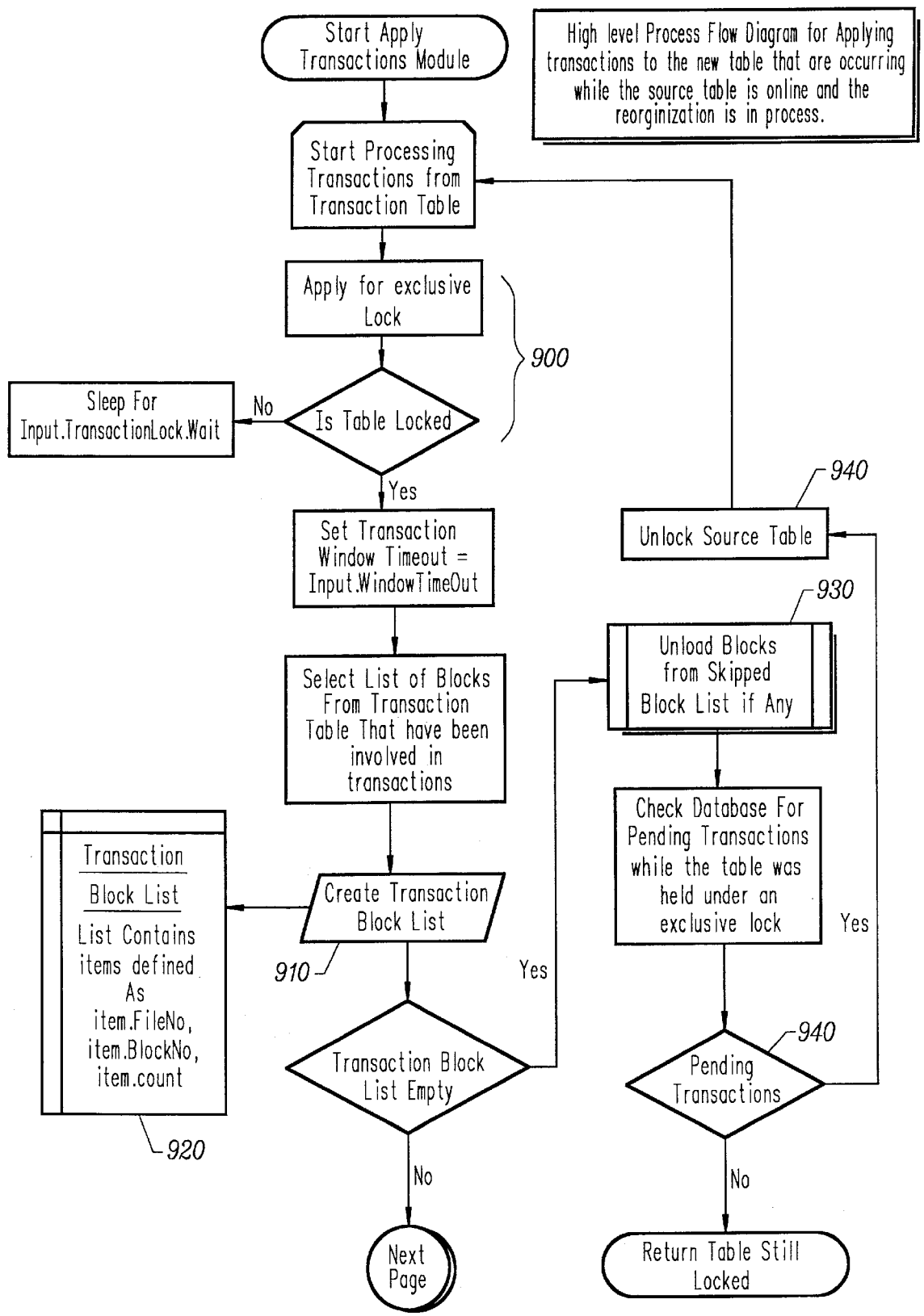
FIG. 9(a) is a flowchart illustrating an apply transactions process.

The apply transaction process, described hereinbelow, updates the new table according to transactions that have occurred to the source table while the reorganization has been/is taking place, and is illustrated in more detail in FIGS. 9A and 9B. The first step is to lock the source table (FIG. 9A, step 900) and create a transaction block list 920 identifying transactions organized by file/block number (step 910). The advantage of doing this is that the process can apply transactions that occurred in each block one block at a time rather than process individual transactions.

If the transaction block list is empty, blocks located in the skipped block list are unloaded/loaded (step 930). If any transactions remain pending since the table was locked, the source table is unlocked to allow the transactions to occur (940), and the apply transactions process is started over.

Figure 9B:
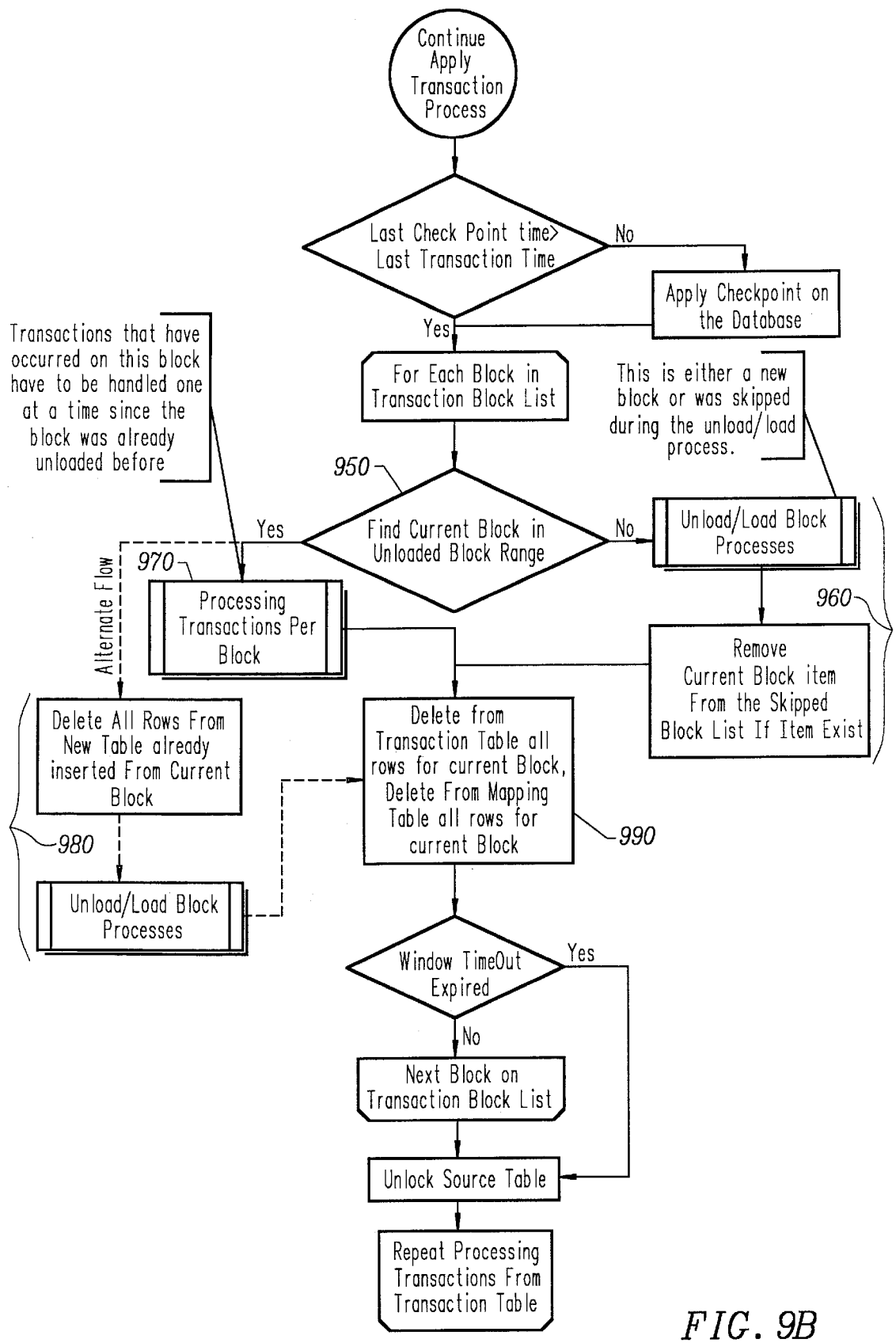
FIG. 9(b) is a continuation of the apply transactions process flowchart of FIG. 9(a)

Continuing with FIG. 9B, for a given file/block found in the transaction table a determination has to be made if this file/block combination participated in the unload process (step 950). This check is made against the file/block ranges stored previously (see 760) during the unload/load block processes 750. The case where the file/block combination was not found the rows of this block would only need to be unloaded and loaded into the new table (960). This effectively processes all the transactions that have occurred for this block. In addition, the file/block combination entry would be removed from the skipped block list and added to the file/block ranges of unloaded blocks.

The case where the block was found means that the rows in this file/block combination are already present in the new table. In one embodiment, the present invention utilizes a processing transaction per block process (970, FIG. 9B) to carry out transactions on the previously unloaded/loaded block.

Figure 10A:
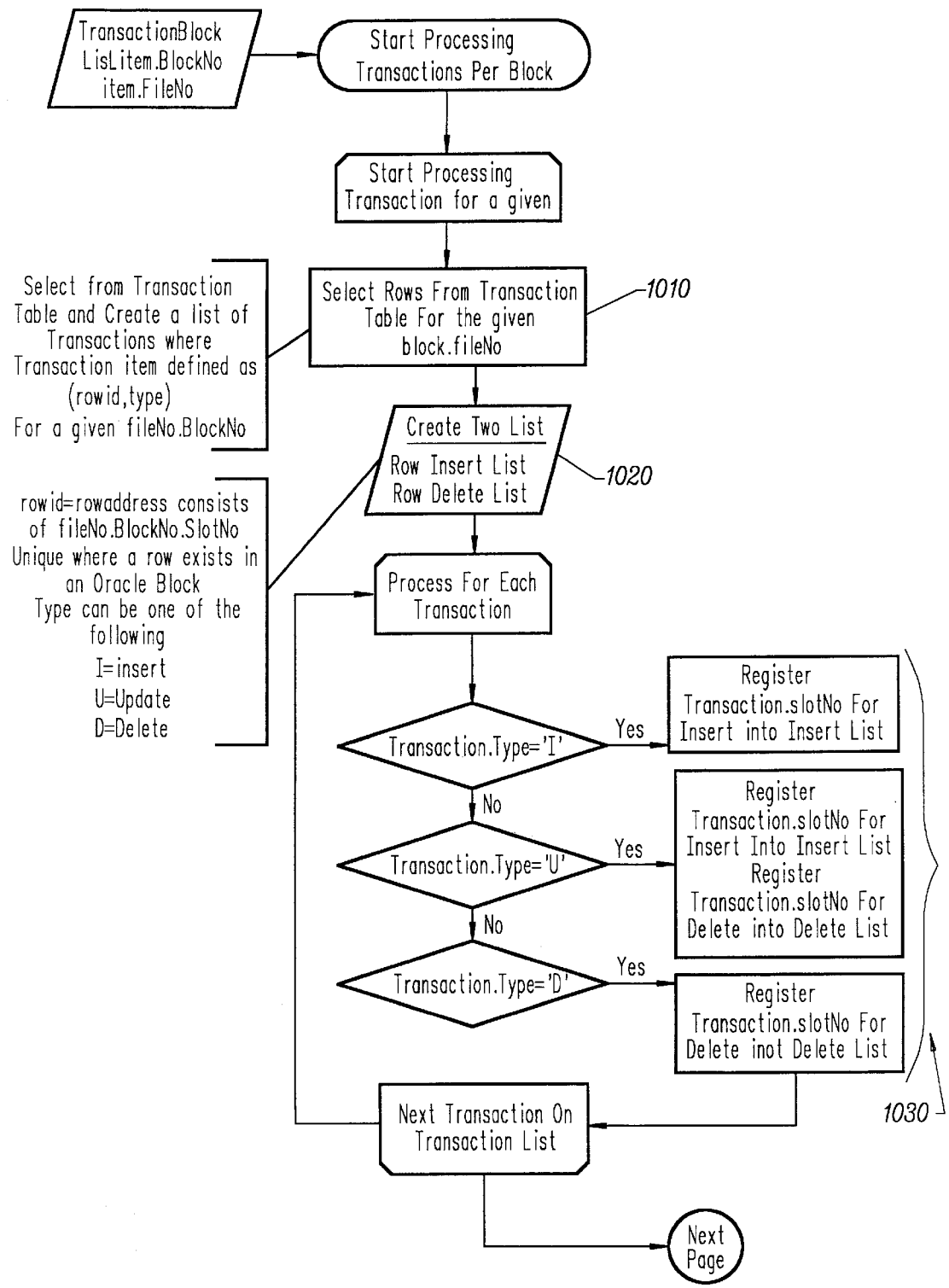
FIG. 10(a) is a flowchart illustrating a processing of transactions per block of the database table.

The processing transactions per block process is illustrated in FIG. 10A. First, the transaction table is utilized to determine rows having a transaction for a specified block (file number, block number combination, step 1010). Then, lists are created of slot numbers for deletions and inserts, if any (step 1020/1030). An update will be treated as a deletion and an insertion.

The list will be created in such a way that only meaningful transactions need to be carried out. For example, if for a given slot an insert/delete/insert is identified, only an insert would be required. For deletions, the mapping table will be used to determine the rows to delete from the new table based on the rowid of the source table row deleted. For insertions, the block will be unloaded and loaded with the following constraint: only rows that are present in the insert list need to be unloaded. The insert list is a list of slot numbers for a given file/block number.

Figure 10B:
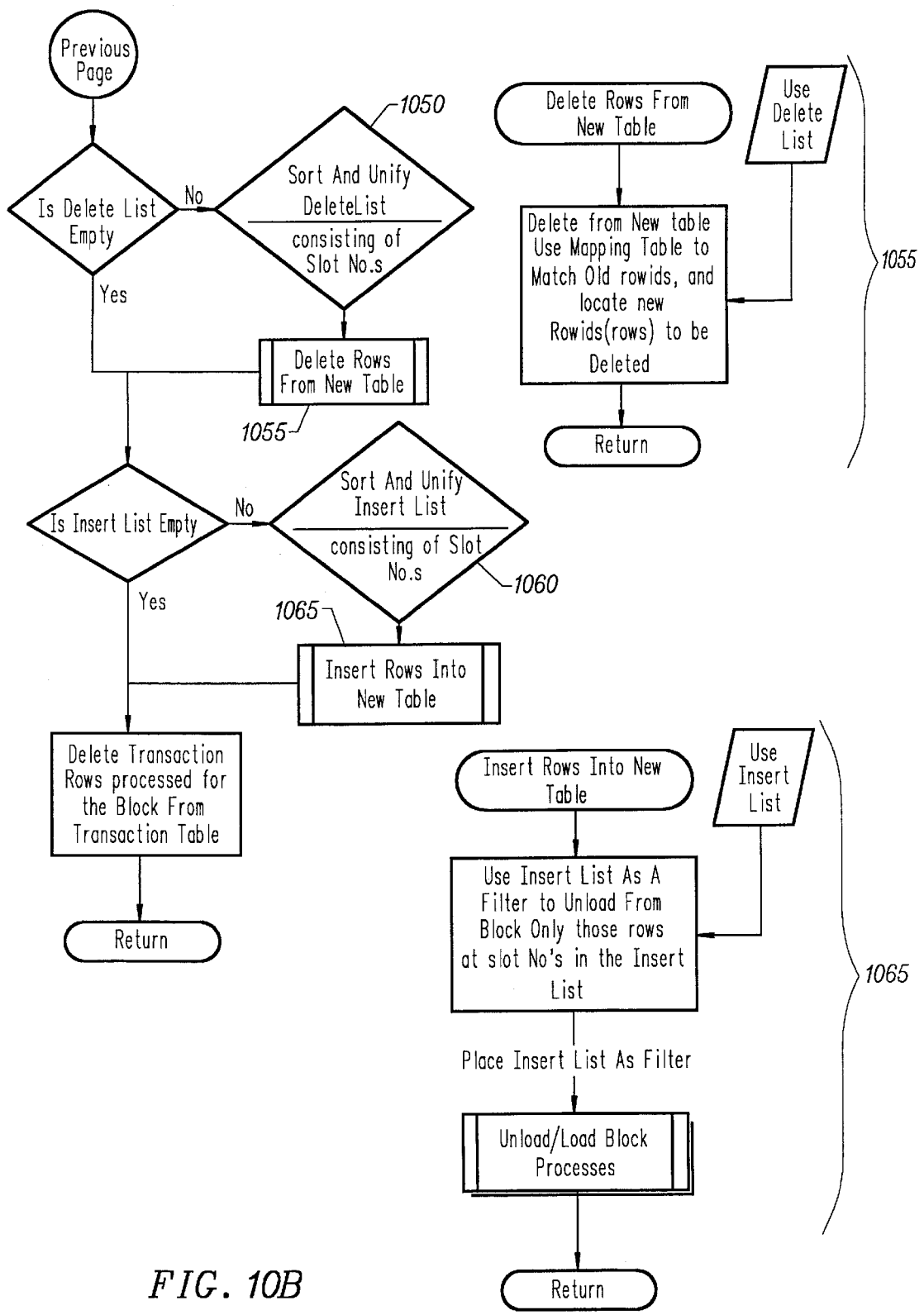
FIG. 10(b) is a continuation of the processing of transactions per block flowchart of FIG. 10(a)

Referring now to FIG. 10B, after the lists are created, if items are present in the delete list, they are organized (by increasing rowid or slot number, for example) (step 1050) and then deleted from the new table (step 1055). In like fashion, if items are present in the insert list, they are organized (step 1060), but inserted into the new table (step 1065). The insert process includes the unload/load processes 750 previously discussed.

In an alternate embodiment, the transactions are processed by deleting all the rows from the new table that were inserted for this file/block combination and then the block is reloaded from the source table (980).

After transactions have been processed, the corresponding rows in the transaction table will be deleted to prevent a transaction from being processed twice. The processing transactions per block process continues until there are no more transactions to process.

Since the source table is online, it is possible that the transaction log table may be filled faster than the transactions can be processed. An additional control parameter may be utilized to control this situation. For example, after a certain threshold value (number of times the process has been carried out) either the action could be to lock the table and consume the remaining transactions or abort the reorganization.

Other parameters may be utilized to control the window of opportunity available for processing transactions. This will allow for time sharing between all other users accessing the source table and the reorganization process.

During the process of updating or changing data blocks, database management systems do not necessarily write all such updates or changes immediately to disk, resulting in dirty blocks (blocks updated, but not yet stored to disk). For efficiency, blocks are sometimes cached in memory, and then several blocks may be written to disk in a single disk write process rather than a separate write processes for each update or change.

In Oracle, a system checkpoint assures that all dirty blocks are written to persistent storage (disk). This system checkpoint may either be invoked autonomously by the DBMS or explicitly requested by programming (e.g., the online reorganization processes of the present invention), or by the DBA.

A default method to process a list of transactions (which may or may not have been written to disk) begins with first applying or invoking a system checkpoint. However, a system checkpoint is time consuming, and a check of times for occurrence of the last transaction and the last system checkpoint will reveal whether such a step is needed. A system checkpoint will not be needed if the time of the last transaction has occurred before the time of the most recent system checkpoint.

For example, if the last transaction occurred at 11:00, the last system checkpoint occurred at 11:10, and the time that the list of pending transactions was processed is 11:20, an additional system checkpoint is not necessary at this point. Conversely, if the last transaction was at 11:15, or anytime at or after the last system checkpoint, an additional system checkpoint would be required to be certain all the transactions have been written to disk.

Once no more entries remain in the transaction table, the skipped block list that had been kept while skipping blocks during the initial unload is checked. Any blocks processed during the apply transactions processes are/have been removed from the skipped block list. In FIG. 9A, file/block entries that remain in the skipped block list are processed by unloading/loading the rows from the corresponding file/block into the new table (step 930).

Once all transactions have been processed, the new table replaces the source table (Switch Source Table Process, step 155), and a cleanup process is invoked (step 160) completing the reorganization process. This is performed by obtaining a final lock on the source table to prevent any further transactions from occurring when no more entries remain in the transaction log table and the skipped block list is empty. The reorganization process must determine whether the source table can be dropped and the new table (which is now up to date with the latest changes) can be renamed to the source. The reorganization process takes into consideration both (1) users who currently have read only access to the source table; and (2) users that have joined a queue of pending transactions waiting for the table to become unlocked.

Figure 11:
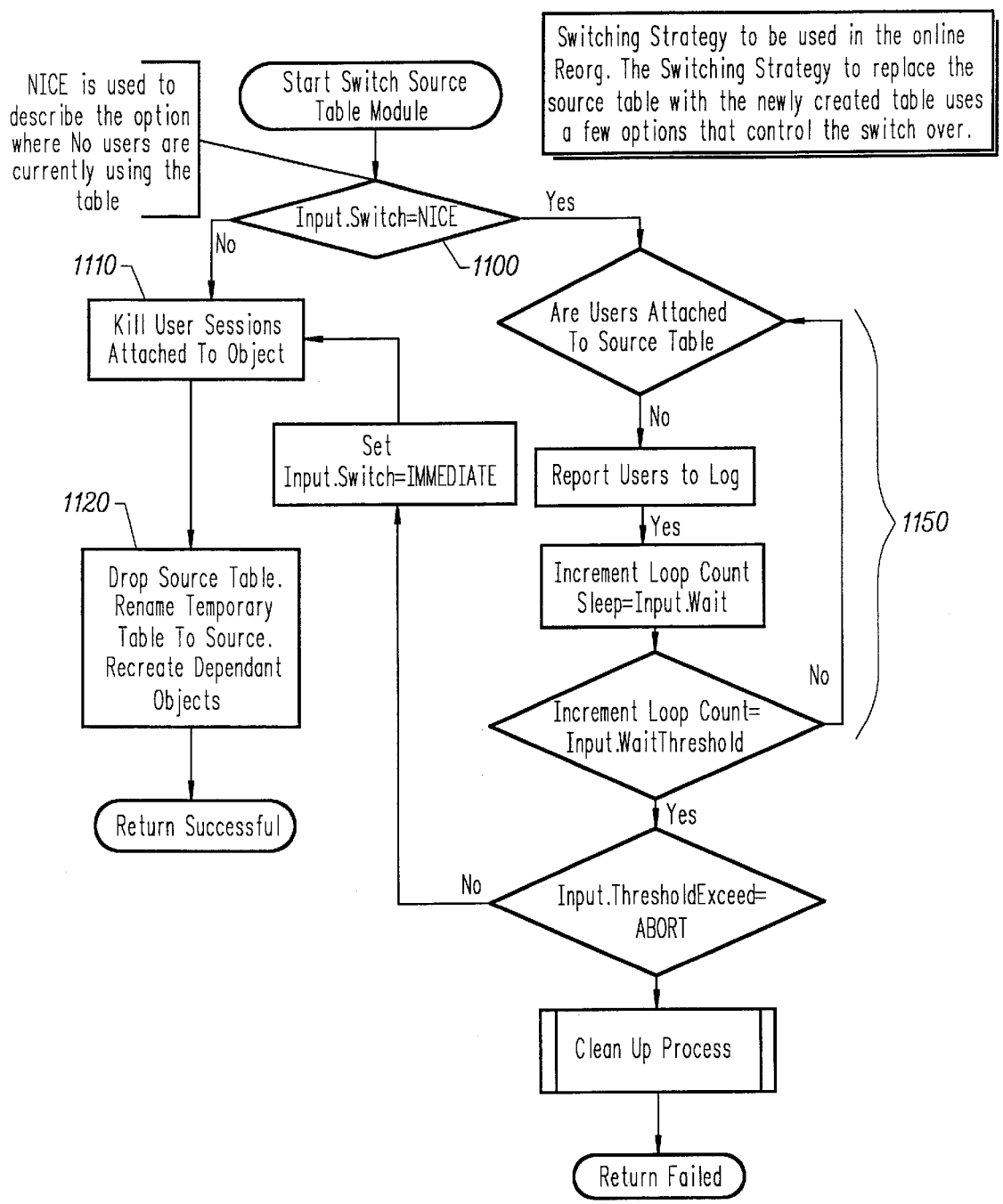
FIG. 11 is a flowchart illustrating the process of switching the source table with the reorganized table.

In the first case the following actions can be made (based on a control parameter NICE, step 1100, FIG. 11): (1) kill the user sessions involved in the read access allowing the table to be dropped (step 1110); or (2) loop on a time interval until all users transactions are terminated (1150). At this point, the table is switched (step 1120). Step 1120 includes creation of dependent objects (indexes, foreign keys, views, etc.), release of the new table (the name is changed to the source table name), and the source table is either dropped or renamed (saving it for backup purposes) completing the reorganization process. Since the new table is not locked, as soon as it is renamed it becomes available to users of the DBMS.

In the second case, when transactions are still pending, the reorganization process releases the lock and repeats the apply transaction processes discussed above.

Table 6 is a preliminary prototype design of the reorganization process discussed herein. The preliminary design is not intended to be either a compilable or executable program or program design language or contain all the features discussed herein, but is illustrative of various functions and processes implemented in an online reorganization consistent with the principles of the above described invention.

TABLE 6

```
Online Reorg prototype design.
1. Parse and store the control file parameters.
      Steps.
            1. Use lex and yacc to parse the file.
                  Implementation. modify the fao_acc.y and fao_cmdline.1 files
in
                  The Fast Analyzer source to parse the control file.
                  For options supported in the control file see
orrg_interface.txt.
                  On an option not specified use default
                  Errors.
                        Exit on any option defined as needed and not present in
                        control file.
            2. Map values obtained to structure of
                  control.login = <login name value>
                  control.passwd = <login password value>
                  control.sid = < oracle sid value>
                  control.home = < oracle home value>
                  control.table = < table name value >
                  control.owner = < table owner value>
                  control.commitSize < commit size value>
                  control.iLock = < NOLOCK|TIMEOUT|FOREVER>
                  control.iLockWait = < No. of seconds value>
                  control.iLockRetry = < No. of time to try value>
                  control.atLock = < TIMEOUT|FOREVER value >
                  control.atLockwait   = < No. of seconds value>
                  control.atLockRetry  = < No. of times to retry>
                  control.atwindow     = < Window for applying transactions secs>
                  control.switch       = < IMMEDIATE|AFTER_ALL_TRANS|NICE value>
            NOTE future refrences to control structure will alias to c.
                  e.g. control.login = c.login
2. Connect to oracle.
      Steps.
            1. Use ora connect in fast analyze api pass c.login , c.passwd and c.sid
                  see connect.h for complete list of parameters.
            Errors.
                  Exit if error received from ora_connect.
3. Do setup of table specified for the online reorg.
      Steps.
            1. If c.iLock <> NOLOCK then Lock table using c.iLockwait, c.iLockRetry,
c.iLock.
                  Error. on error or timeout exit.
            2. Check point system.
                        SQL= "alter system checkpoint global"
            3. Find system change number for the checkpoint.
                        SQL= "select checkpoint change# from v$database"
                        REORG SCN=<result>
            4. Create trigger and transaction table to keep an audit of all future
transactions.
                        Create transaction table as TSREORG$LOG
                  SQL= "create sequence <c.owner>.TSREORG$LOGID increment by 1";
                  SQL= "create table <c.owner>TSREORG$LOG ( \
                        logid number,
                        M ROW$$ varchar(255), \
                        dmltype char(1) \
                        updtime date \
                        )"
            5. Create trigger on TABLE(c.owner,c.table)
                  SQL="CREATE OR REPLACE TRIGGER <c.owner>.TSREORG$TRIG
                        after insert or update or delete on <c.owner.c.table> \
                        referencing old as old \
                        for each row \
                              declare dmltype char; \
                              begin if inserting then dmltype:='I'' \
                                 elsif   updating    then dmltype 'U';      \
                                 elsif   deleting    then dmltype 'D';      \
                              end if;
                              insert into <c.owner>.TSREORG$LOG
                        (TSREORG$LOGID.next,m_row$$, dmltype)"
```

TABLE 6-continued 6. commit 4 and 5 this will unlock the table if locked.
    Error. On error exit.
    Implementation
      Write a function 'createSql' that will take a sql stmt and form a new statement replacing c.owner with value and c.table with value.
      Write a function 'execSql' that will exec a sql statement.
      These functions should be used in steps 1,2,3,4,5.
      commit will use oci ocom.
 4. Create new table and associated DDL.
    Steps.
    1. Create new table
      SQL='create table c.owner, c.TSREORG$TEMP
        as select * from <c.owner>.<c.table>
        where 1 = 2'
      This should create an empty table.
    2. Create a table to map old rowids and new rowids.
      SQL='create table <c.owner>.TSREORG$MAP
            file#number,
            block*number,
            slot*number, nrow$$
            varchar2(18) )"
    3. Create indexes for map table.
      SQL="create index <c.owner>.TSREORG$IDX_1 on <c.owner>.TSREORG$MAP (1
        (orow$$)'
      SQL="create index <c.owner>.TSREORG$IDX_2 on <c.owner>.TSREORG$MAP (\
        (nrow$$)"
    4. commit the above.
    implementations
      Again createSql and execSql can be used to create and exec the sql.
 8. Unload and load rows from blocks where BLOCK SCN < REORG SCN defined in step 3.
    Steps.
    1. read extent list.
    2. get columns of <c.owner.table> and create column list.
    3. from column list create insert sql.
      SQL= insert into <c.owner>.TSREORG$TEMP values ( i1,...in).
      5. allocate memory to such that memory >= no columns*max column size*array size.
    6. unload rows from a block into memory.
    7. load rows from memory using oci into TSREORG$TEMP.
      for each row to be loaded hold on to fileno,blockno,slotno of the row
      SQL=declare nrowid rowid ; begin
        insert into <c.owner>.TSREORG$TEMP values (i1,...in);
        nrowid = DBMS_SQL.LAST_ROW_ID();
        insert into <c.owner>.TSREORG$MAP values (fileno,blockno,slotno);
        end;
    8. commit based on c.arrSize. The above sql can be done using array inserts.
    9. store in memory every block unloaded as ( fileNo,BlockNo) in BlockHeap.
    Implementation. Use modified fast unload source and tsreorg insert source
    to achieve 1,8.
      Create module to efficiently insert,delete and retrieve
        fileNo,BlockNo values into BlockHeap.
    Implementation of BlockHeap. The BlockHeap will be constructed as a tree
    using the otree api already developed. the BlockHeap Node
    will contain the following elements.
      BlockHeap Node FileNo
        Start
        Len.
    The insert into a tree will be modified as following.
    For a new n.FileNo,n.Block the following modifications must be made to
    accomodate range values.
    if n.FileNo != c.FileNo where c is the current node being examined.
    then insert as per tree insert.
    if n.FileNo = c.FileNo && n.Block != c.Start
        if n.Block is in (c.Start+c.len) then c.len++
        else insert new node as per tree insert
      set new.Start=n.Block new.FileNo=n.FileNo and new.len=1
    if n.FileNo = c.FileNo && n.Block = n.Start do nothing.
      Search for a s.fileNo,s.Block in the BlockHeap will be conducted as follows.
      Found=False.
      do until Found=TRUE OR end of tree is reached. Then Found =False.

TABLE 6-continued

```
            if ( s. fileNo, s. Block == c. fileNo, c. Start) then Found=TRUE return.
            if ( s.fileNo == c.fileNo && s.Block != c.Start)
                    if ( s.Block in ( c.start + c.len) then Found=TRUE return.
                if ( end of tree ) return Found=FALSE.
            else continue to next node.
        9. Loop application of transactions that have occured and stored in
TSREORG$LOG.
        Steps.
                1. Lock <c.owner>.<c.table> in read only mode. using c.atLock,
c.atLockWait,
                c.atLockRetry.
        2. After Lock obtained proceed to select a list of transactions to process.
                2. LastUpdateTime=select max(updtime) from TSREORG$LOG;
                3. LastCheckPointTime=select check_point from V$THREAD;
                4. if LastCheckPointTime < LastUpdateTime
                        apply system checkpoint.
                5. Select blocks for applying transaction updates to the new table.
                        select FILE(mrow$$) , BLOCK(mrow$$) ,updtime
                        from TSREORG$LOG where updtime > LastAppliedTime
                        order by 1,2,3 intial LastAppliedTime is NEVER.
        6. Taking a Block(file,block) at a time. Check Block Heap if
                Block is present i.e already unloaded.
                7. Start Window Timer based on c.atLockWindow.
                8. if ( not Found ) then
                        8. Unload this block
                        9. Insert unloaded rows into new table.
                        10. update BlockHeap, with new block
                    else
                        select transaction list for this block.
                        foreach row ( File,Block,Slot) update a slot_bit array
                        in the form slot bit[ slot ] = 0x01 (binary 00000001) for insert
                            slot bit[ slot ]= 0x03(binary 00000011) for update
                            slot bit[ slot ]= 0x02(binary 00000010) for delete.
                9. pass the slot_bit array to an unload function taking
                        file,block and slot_bit array. Only unload the rows
                        that from an oracle block where for a given slot
                        The slot_bit[slot] & 0x01 is true.
        10. Delete from new table TSREORG$TEMP rows is any. delete criteria is
                    file,block,slot in TSREORG$LOG
                    matches file block slot
                    bit[slot]&0x20 is true.
                delete from TSREORG$TEMP where rowid in
                    select nrowid from TSREORG$MAP where file#=:file
                    and block#=:block and
                        slot#=:slot) ;
                10. update TSREORG$LOG for the rows processed with sysdate.
                11. if Window has expired release Lock. and sleep.
                12. if Window has not expired go to next block.
                13. if no more Blocks present then
                        if ( pending transactions )
                            select count(*) fron V$LOCK where id1      <source object_id>
                            >1. ( since I = reorgs current session
                            release lock and sleep.
                    else
                        We are done.
                14. Apply Switch based on c.switch.
                15. Applying the switching Algorithm and completing the reorg.
        0. Find what session id are using current reorged object.
        BQL="select s.sid , s.serial#, username,osuser,machine from
                    v$session s , v$access v
                where v.sid = s.sid and
                        a.owner=<c.owner> and a.object=<c.table> and /* not your
session*/
                your session s.process <> getpid();"
        1.if (c.switch == IMMRDIATE) Kill any sessions connected to source table.
                sql="alter system kill session
                goto 11.
        To obtain a list of sessions that are currently read only for this table.
    2.if ( c.switch == NICE)
        if Any sessions are connected to source
            Release Lock and goto 9.
            sessions are connected to source. goto 11.
        11. Drop source table, rename new table to source and create dependant objects.
        12. End Reorg cleanup.
```

The present invention has been described in terms of database management systems and particularly the reorganization of tables in a DBMS. However, the teachings presented herein may also be applied to numerous tables or data storage repositories not directly linked to a DBMS system, such as spreadsheet files, work processing files and other data storage devices.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, and magneto-optical disks, ROMs, RAMs, EPROMs, EEPROMS, magnetic or optical cards, or any type of media suitable for storing electronic instructions.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the reorganization processes on at least one selected database table, as described above.

Included in the programming (software) of the general/specialized computer or microprocessor are software modules for implementing the teachings of the present invention, including, but not limited to, identification and retrieval of database table structures, copying of database tables, unloading and loading data blocks, extracting row information, logging transactions, applying logged transactions, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A method of on-line reorganization of a source table, comprising the steps of:

establishing a timestamp identifying a point in time and a state of said source table at said point in time;

making a reorganized copy of said source table by,
creating a new object for maintaining said reorganized copy, unloading data from blocks of said source table that are unmodified since said timestamp, and loading the data into said new object;

applying transactions occurring after said timestamp to the reorganized table; and switching said source table with the reorganized table.

2. The method according to claim 1, further comprising the steps of:

employing a trigger on said source table for logging entries of transactions on said source table in a transaction table;

obtaining a lock on said source table to prevent transactions from occurring to said source table;

deleting entries logged by said trigger prior to obtaining said lock on said source table;

unlocking said source table; and performing said step of making a reorganized copy of said source table at said timestamp;

wherein said steps of employing a trigger and obtaining a lock are performed prior to said step of establishing a timestamp.

3. The method according to claim 2, wherein:

said step of applying transactions comprises the steps of,
obtaining an exclusive lock on said source table,
applying transactions, from said transaction table, corresponding to blocks of said source table previously unloaded, to the data loaded into said new object,
unloading data from blocks of said source table involved in transactions since said timestamp and not previously unloaded, and loading it into said new object, and
releasing said exclusive lock on said source table.

4. The method according to claim 2, wherein:

said step of applying transactions comprises the steps of,
obtaining an exclusive lock on said source table,
deleting data previously loaded into said new object and corresponding to blocks identified in said transaction table,
unloading modified data of said source table from blocks previously unloaded and identified in said transaction table, and loading the modified data into said new object,
unloading data from blocks of said source table involved in transactions since said timestamp and not previously unloaded, and loading it into said new object, and
releasing said exclusive lock on said source table.

5. The method according to claim 1, wherein said source table is a database table.

6. The method according to claim 5, wherein:

said step of creating a new object comprises creating a new database table object for maintaining said reorganized copy;

said step of unloading data comprises
reading blocks of table information from the unloaded data blocks of said source table untouched since said timestamp; and said step of loading the data comprises,
extracting row information from the blocks read, and storing said row information in the new database table object.

7. The method according to claim 6, wherein:

said step of creating a new database table object comprises the steps of,
retrieving a database Data Definition Language (DDL) schema for the source database table, and
creating said new database table object utilizing said DDL; and said step of creating a reorganized copy further comprises the step of establishing an indexing system to reference locations where said row information is retrieved from the source database table and stored in said new database table object.

8. A method of on-line reorganization of a source table, comprising the steps of:
employing a trigger on said source table for logging entries of transactions on said source table in a transaction table;
obtaining a lock on said source table to prevent transactions from occurring to said source table;
deleting entries logged by said trigger prior to obtaining said lock on said source table;
establishing a timestamp identifying a point in time and a state of said source table at said point in time;
unlocking said source table;
creating a reorganized copy of said source table at said timestamp;
applying transactions occurring after said timestamp to the reorganized table; and
switching said source table with the reorganized table, wherein:
said steps of employing a trigger and obtaining a lock are performed prior to said step of establishing a timestamp; and
said step of applying transactions comprises the steps of,
obtaining an exclusive lock on said source table,
applying remaining entries in said transaction log to the reorganized table, and
determining if any additional transactions are pending as a result of said exclusive lock, and if additional transactions are pending, performing the steps of,
releasing said exclusive lock on said source table, and
repeating said steps of obtaining an exclusive lock, applying remaining entries, and determining until no more additional transactions are pending.

9. The method according to claim 8, wherein:
said step of establishing a timestamp comprises,
determining a System Change Number for use as said timestamp, said System Change Number providing a unique identifier for any transaction occurring to any one of said source table and other tables or objects maintained in conjunction with said source table.

10. A computer readable medium having computer instructions stored thereon that, when loaded into a computer, cause the computer to perform the steps of:
establishing a timestamp identifying a point in time and a state of said source table at said point in time;
making a reorganized copy of said source table by,
creating a new object for maintaining said reorganized copy,
unloading data from blocks of said source table that are unmodified since said timestamp, and
loading the data into said new object;
applying transactions occurring after said timestamp to the reorganized table; and
switching said source table with the reorganized table.

11. The computer readable medium according to claim 10, wherein said instructions stored thereon further cause the computer to perform the steps of:
employing a trigger on said source table for logging entries of transactions on said source table in a transaction table;
obtaining a lock on said source table to prevent transactions from occurring to said source table;
deleting entries logged by said trigger prior to obtaining said lock on said source table;
unlocking said source table;
performing said step of making a reorganized copy of said source table at said timestamp; and
wherein said steps of employing a trigger and obtaining a lock are performed prior to said step of establishing a timestamp.

12. The computer readable medium according to claim 11, wherein:
said step of applying transactions comprises the steps of,
obtaining an exclusive lock on said source table,
applying transactions, from said transaction table, corresponding to blocks of said source table previously unloaded, to the data loaded into said new object,
unloading data from blocks of said source table involved in transactions since said checkpoint and not previously unloaded, and loading it into said new object, and
releasing said exclusive lock on said source table.

13. The computer readable medium according to claim 11, wherein:
said step of applying transactions comprises the steps of,
obtaining an exclusive lock on said source table,
deleting data previously loaded into said new object and corresponding to blocks identified in said transaction table,
unloading modified data of said source table from blocks previously unloaded and identified in said transaction table, and loading the modified data into said new object,
unloading data from blocks of said source table involved in transactions since said timestamp and not previously unloaded, and loading it into said new object, and
releasing said exclusive lock on said source table.

14. The computer readable medium according to claim 10, wherein:
said source table is a database table; and
said step of creating a new object comprises creating a new database table object for maintaining said reorganized copy,
said step of unloading data comprises reading blocks of table information from the unloaded data blocks of said source table untouched since said timestamp, and
said step of loading the data comprises,
extracting row information from the blocks read, and
storing said row information in the new database table object.

15. The computer readable medium according to claim 14, wherein:
said step of creating a new table object comprises the steps of,
retrieving a database Data Definition Language (DDL) schema for said database table, and
creating said new table object utilizing said DDL; and
said step of creating a reorganized copy further comprises the step of establishing an indexing system to reference locations where said row information is retrieved from said database table and stored in said new table object.

16. A computer readable medium having computer instructions stored thereon that, when loaded into a computer, cause the computer to perform the steps of:

employing a trigger on said source table for logging entries of transactions on said source table in a transaction table;

obtaining a lock on said source table to prevent transactions from occurring to said source table;

deleting entries logged by said trigger prior to obtaining said lock on said source table;

establishing a timestamp identifying a point in time and a state of said source table at said point in time;

unlocking said source table;

creating a reorganized copy of said source table at said timestamp;

applying transactions occurring after said timestamp to the reorganized table; and switching said source table with the reorganized table, wherein:

said steps of employing a trigger and obtaining a lock are preformed prior to said step of establishing a timestamp;

wherein said step of applying transactions comprises the steps of, obtaining an exclusive lock on said source table, applying remaining entries in said transaction log to the reorganized table, and determining if any additional transactions are pending as a result of said exclusive lock, and if additional transactions are pending, performing the steps of, releasing said exclusive lock on said source table, and repeating said steps of obtaining an exclusive lock, applying remaining entries, and determining until no more additional transactions are pending.

17. The computer readable medium according to claim 16, wherein said step of establishing a timestamp comprises the step of:

determining a System Change Number for use as said timestamp, said System Change Number providing a unique identifier for any transaction occurring to any one of said source table and other tables or objects maintained in conjunction with said source table.

18. An apparatus for on-line reorganization of a source file, comprising:

a checkpoint device configured to establish an SCN checkpoint comprising a point in time and identifying a state of said source file at said point in time;

a copy mechanism configured to create a reorganized copy of said source file;

applying transactions occurring after said timestamp to the reorganized file;

switching said source file with the reorganized file;

trigger configured to log entries of transactions on said source file in a transaction table;

a locking mechanism configured to obtain a lock on said source file to prevent transactions from occurring to said source file;

a removal device configured to delete entries logged by said trigger prior to obtaining said lock on said source file; and an unlocking mechanism configured to unlock said source file;

wherein:

said copy mechanism comprises, a creation device configured to create a new object for maintaining said reorganized copy, an unloading mechanism configured to unload data from blocks of said source file that are unmodified since said timestamp; and a loading mechanism configured to load the data into said new object.

19. The apparatus according to claim 18, wherein said transaction device comprises:

a selection mechanism configured to select transactions corresponding to blocks of said source file previously unloaded, to be applied to the data loaded into said new object; and an unload/load device configured to unload data from blocks of said source file involved in transactions since said timestamp and not previously unloaded, and load the data into said new object.

20. The apparatus according to claim 18, wherein said transaction device comprises:

a delete mechanism configured to delete data previously loaded into said new object and corresponding to blocks identified in said transaction table; and an unload/load device configured to, unload modified data of said source file from blocks previously unloaded and identified in said transaction table, and loading the modified data into said new object, and unload data from blocks of said source file involved in transactions since said timestamp and not previously unloaded, and loading it into said new object.

21. The apparatus according to claim 18, wherein:

said source file is a database table;

said creation device comprises an object device configured to create a new table object for maintaining said reorganized copy;

said unloading mechanism comprises a reading mechanism configured to read blocks of table information from said database file, and an extraction device configured to extract row information from the blocks read; and said loading mechanism comprises a storing mechanism configured to store said row information in the new table object.

22. The apparatus according to claim 21, wherein:

said object device comprises, a DDL replicator configured to retrieve a database Data Definition Language (DDL) schema for said database table, and create said new table object utilizing said DDL; and said apparatus further comprises an indexer configured to reference locations where said row information is retrieved from said database table and stored in said new table object.

23. The apparatus according to claim 22, wherein said checkpoint device further comprises:

a trigger configured to log entries of transactions on said database table in a transaction table;

a locking mechanism configured to obtain a lock on said database table to prevent transactions from occurring to said source table;

a removal device configured to delete entries logged by said trigger prior to obtaining said lock on said database table; and an unlocking mechanism configured to unlock said database table.

24. An apparatus for on-line reorganization of a source file, comprising:

a checkpoint device configured to establish an SCN checkpoint comprising a point in time and identifying a state of said source file at said point in time;

a copy mechanism configured to create a reorganized copy of said source file;

applying transactions occurring after said timestamp to the reorganized file;

switching said source file with the reorganized file;

a trigger configured to log entries of transactions on said source file in a transaction table;

a locking mechanism configured to obtain a lock on said source file to prevent transactions from occurring to said source file;

a removal device configured to delete entries logged by said trigger prior to obtaining said lock on said source file; and an unlocking mechanism configured to unlock said source file; wherein said transaction device comprises, an applicator configured to apply remaining entries in said transaction log to the reorganized file;

a decision mechanism configured to determine if any additional transactions are pending as a result of said source table being locked; and a controller configured to repeatedly release said exclusive lock on source file, obtain an exclusive lock on said source file, and apply remaining entries in said transaction log until no more additional transactions are pending via utilization of said locking mechanism, unlocking mechanism, applicator, and decision mechanism.

25. The apparatus according to claim 24, wherein said SCN checkpoint comprises a System Change Number providing a unique identifier for any transaction occurring to any one of said source file and other files or objects maintained in conjunction with said source file.

26. An apparatus for on-line reorganization of a source table, comprising:

means for employing a trigger on said source table for logging entries of transactions on said source table in a transaction table;

means for obtaining a lock on said source table to prevent transactions from occurring to said source table;

means for deleting entries logged by said trigger prior to obtaining said lock on said source table; and means for establishing a timestamp comprising a point in time and identifying a state of said source table at said point in time;

means for creating a reorganized copy of said source table in a state just prior to said timestamp;

means for unlocking said source table;

means for applying transactions occurring after said checkpoint to the reorganized table; and means for switching said source table with the reorganized table;

wherein said means for creating a reorganized copy of said source table comprises
means for creating a new object for maintaining said reorganized copy;
means for unloading data from blocks of said source table that are unmodified since said timestamp, and
means for loading the data into said new object.

27. The apparatus according to claim 26, further comprising means for dropping said source table after switching said reorganized table with said source table.

28. The apparatus according to claim 26, wherein:

said source table is a database table; and said means for creating a reorganized copy comprises,
said means for creating a new object comprises means for creating anew table object for maintaining said reorganized copy;

said means for unloading comprises means for reading blocks of table information from said database table, and means for extracting row information from the blocks read; and said means for loading comprises means for storing said row information in the new table object.

29. The apparatus according to claim 22, wherein said means for reading blocks, comprises:

means for directly opening a file containing said database table; and means for directly reading said blocks of table information from the opened file;

wherein said means for reading blocks bypasses any SQL interfaces available from a management system associated with said database table.

* * * * *